United States Patent [19]

MacLean

[11] 4,162,834
[45] Jul. 31, 1979

[54] PROCESSING APPARATUS FOR LARGE FORMAT CAMERAS

[75] Inventor: Allan D. MacLean, North Easton, Mass.

[73] Assignee: Polaroid Corporation, Cambridge, Mass.

[21] Appl. No.: 863,992

[22] Filed: Dec. 23, 1977

[51] Int. Cl.² .......................................... G03B 17/50
[52] U.S. Cl. ........................................ 354/86; 354/88
[58] Field of Search ............... 354/86, 84, 88, 303; 96/200, 201; 239/598; 118/63

[56] References Cited

U.S. PATENT DOCUMENTS

| 2,520,641 | 8/1950 | Land | 354/84 |
| 3,526,204 | 9/1970 | Schnedler et al. | 118/63 X |
| 4,054,231 | 10/1977 | Eloranta | 222/102 |

*Primary Examiner*—L. T. Hix
*Assistant Examiner*—Thomas H. Tarcza

*Attorney, Agent, or Firm*—Edward S. Roman

[57] ABSTRACT

Processing apparatus for large format, instant cameras in which a metered supply of processing fluid, deposited as a puddle in a crease between negative and positive photographic sheets as they are fed from separate supply rolls to the nip of a pressure roll pair, is spread throughout an image format area by passage of the sheets through the pressure roll nip. Containment of the processing fluid laterally so that it is confined to the side margins of the image format area is effected by a pair of nozzle members each having a blade portion to lie in and generally complement the configuration of the crease at opposite ends thereof. The nozzle blades are formed with passageways through which air may be directed inwardly and downwardly against the ends of the processing fluid puddle during the time the sheets are fed through the pressure roll pair to spread the fluid uniformly over the image format.

7 Claims, 6 Drawing Figures

PROCESSING APPARATUS FOR LARGE FORMAT CAMERAS

BACKGROUND OF THE INVENTION

This invention relates to photographic processing apparatus and more particularly, it concerns an improved apparatus for delineating opposite marginal edges of a processing fluid layer as it is spread between negative and positive sheets over the image format area of self-processing, large format cameras.

As described in a commonly assigned U.S. Pat. No. 4,054,231, entitled "Photographic Apparatus" and issued Oct. 18, 1977 to Vaito K. Eloranta, technology is available for in-camera exposure and processing of photographic sheet material having image format areas of several square feet. Cameras employing this technology have been constructed and in use have demonstrated a capability for producing photographic prints of exceptionally high quality in formats as large as 40" by 84". While extremely large format cameras of this type are in the nature of a laboratory room which can be entered by an adult person and operated from within to photograph subjects positioned in the optical field of the camera, formats on the order of 20" by 24" can be accomodated by cameras adequately mobile to be transported and positioned in relation to stationary subjects.

The construction of such large format cameras conventionally entails the provision of a lens and shutter supported by a movable lens board defining a light-tight enclosure with a bellows and camera body. Associated with the camera body is a hinged back capable of supporting separate rolls of negative and positive photographic sheet material used in diffusion transfer photographic processing. As is well known in the art, such processing involves the exposure of negative sheet material and the distribution of a processing fluid between the exposed negative and a superimposed positive sheet to which the latent negative image is transferred as a positive photographic print. As disclosed in the aforementioned patent, the negative sheet material in large format cameras of the general type under discussion is preferably fed downwardly in the camera film plane from a roll located near the top of the camera body interior. After exposure, the negative is superimposed with a sheet of positive material fed from a roll located near the bottom of the camera body interior. The superimposed sheets are drawn between the nip of a motor driven processing roller pair so that processing fluid deposited on the sheets in accordance with the disclosure of the afore-mentioned patent is spread fully and uniformly over the image format area. As the two sheets and processing fluid are fed through the processing roller pair, they emerge from the bottom of the camera body and after a suitable imbibition time, are separated to provide the finished positive and the spent negative sheet to be discarded.

Complete coverage of the image format area by the processing fluid is assured by depositing a metered quantity of the fluid in advance of the bottom margin of the exposed negative area so that as the negative and positive sheets pass the nip of the pressure roll pair, the supply of fluid will be exhausted only after the top margin of the exposed area has passed the nip. Because the side edges of both sheets at the region in advance of the roll nip are opened or spaced, some provision must be made to contain the fluid laterally and thus delineate side margins of the applied processing fluid at or slightly outside of the opposite side margins of the image format area.

The problem of laterally containing a puddle or pool of fluid above the nip of a roller pair through which a pair of sheets are fed to sandwich the fluid, in itself, is not unique to handling processing fluid in large format cameras of the type mentioned. In the manufacture of certain types of multi-layer film packs, for example, a fluid to be spread uniformly between two superimposed sheets is fed continuously through an appropriate supply nozzle to a region overlying the nip of a pair of rollers about each of which one of the two sheets is trained. Lateral containment of the fluid thus applied has been accomplished by an organization of a downwardly and inwardly directed air jet defining ends of a puddle maintained to a pre-determined height above the nip by suction means to prevent the quantity of the liquid puddle from exceeding the capacity of the air jet. While this solution to lateral containment of a continuously supplied fluid to continuously fed sheets has been used effectively in processing manufacture of photographic materials, the apparatus employed does not account in any way for the space constraints of a camera environment and particularly, the need for presenting the unobstructed image format area of a negative sheet for exposure to be followed immediately by the application of processing fluid.

SUMMARY OF THE PRESENT INVENTION

In accordance with the present invention, a premetered supply of processing fluid, deposited in advance of a camera enclosed pressure roll nip through which negative and positive photographic sheet material is fed for processing a latent image on the negative sheet, is laterally contained to delineate the side margins of processing fluid application over a large image format area by a pair of air nozzle members of novel construction. The nozzle members, which are identical except for left and right-hand orientation, each include a one piece structure having a blade-like portion to lie in and complement the crease defined between the negative and positive sheets as they enter the pressure roll nip. The inboard end of each blade-like portion is a flat surface at right angles to a bottom edge. A slot, lying on a medial plane bisecting front and rear downwardly converging surfaces on the blade-like portion, extends through the end surface and the bottom edge of the blade portion. The slot bottoms at a diagonal line extending between the end surface and the bottom edge and opens to an air passageway to establish a downwardly and inwardly directed nozzle opening from which air may be discharged to delimit the side margins of the processing fluid applied between the negative and positive sheets.

Accordingly, among the objects of the present invention are: the provision of an improved processing apparatus for large format cameras; to provide such an apparatus by which the side edges of processing fluid between separate sheets of photographic material may be effectively controlled during application of the fluid by passage of the sheets through the nip of a pressure roll pair; the provision of such an apparatus which is self-cleaning; and the provision of such an apparatus which is extremely simple and capable of being mounted within a large format camera back without interference with other camera operating functions.

Other objects and further scope of applicability of the present invention will become apparent from the de-

DETAILED DESCRIPTION OF THE PREFERRED EMBODIMENT

Figure 1:
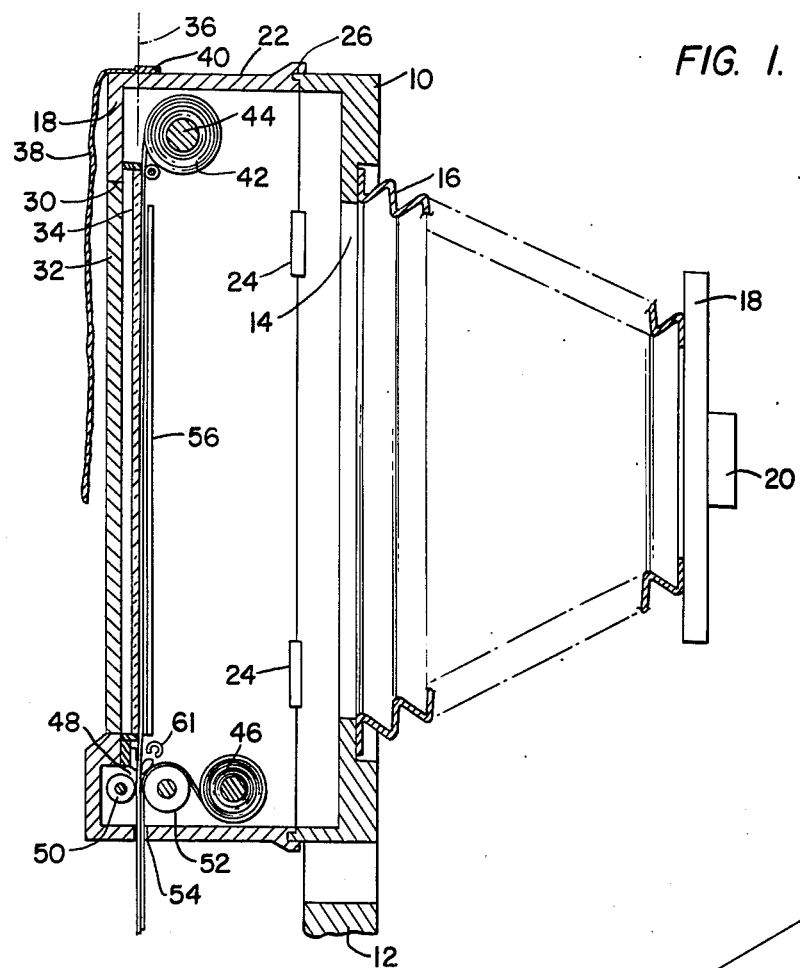
FIG. 1 is a largely schematic vertical cross-section of a large format camera incorporating the present invention.

In FIG. 1 of the drawings, a large format camera is shown schematically to include a body 10 appropriately supported by a carriage 12 and having a forwardly disposed opening 14 about which a bellows 16 is secured. The bellows is conventionally pleated for collapsibility and extends forwardly to a lens board 18 supporting an objective lens 20 as well as other conventional exposure components such as a shutter and diaphragm (not shown). Large format cameras of this type are capable of producing directly a photographic image on the order of 20" by 24" or larger. It will be appreciated, therefore, that the size of the body 10 and other components designated in FIG. 1 will be correspondingly large. For example, although the support 12 is shown only schematically in FIG. 1, in practice the support is a relatively elaborate structure and will extend to support the lens board 18 in a manner to position the lens 20 precisely on the optical axis of the camera.

A camera back 22 is pivotally supported from one side of the body 10 such as by hinges 24 and having an appropriate light seal 26 so that when closed in the position shown in FIG. 1, the back 22 defines with the body 10, the bellows 16 and the lens board 18 in a light-tight enclosure. The back 22 is a box-like structure having a back wall 28 with an opening 30 provided with a hinged, light-tight door 32. The opening 30 is coextensive with a translucent viewing screen 34, the front surface of which locates the film plane 36 of the camera. A viewing hood 38 is preferably removably secured such as by a "Velcro" strip 40 secured along the top wall of the camera back 22.

Across the upper portion of the interior of the camera back 22 a roll of photosensitive, negative sheet material 42 is adapted to be supported on a rotatable mandrel 44. A similar roll of positive sheet material 46 is rotatably supported across the bottom of the interior camera back. In the condition illustrated in FIG. 1 where the back 22 is closed against the camera body and the door 32 closed into the opening 30, the camera is readied for exposure by drawing the negative sheet material 42 from the roll downwardly in front of the viewing screen 34 to the nip 48 of a processing roll pair 50 and 52 and outwardly through a slot 54 in the bottom wall of the camera back 22. The positive sheet 46 is drawn from the roll over the pinch roll 52 and also downwardly through the slot 54. Side guides 56 are secured to frame components 58 and 60 of the camera back 22 along the margins of the viewing screen 34 to assure retention of the negative sheet against the front face of the viewing screen 34 and thus oriented properly on the film plane 36.

After the negative sheet, positioned as shown in FIG. 1, is exposed to a subject to be photographed through the lens 20, a supply of diffusion transfer processing fluid is deposited in the crease between the front of the negative sheet and the front of the positive sheet at the nip 48 of the pinch roll pair. To facilitate this deposition of processing fluid, an inverted tubular trough 61 is located appropriately above the nip 48 of the processing roll pair. The trough communicates with an opening in the side walls of the camera back through which a straw of processing fluid may be deposited in accordance with the teachings of the afore-mentioned U.S. Pat. No. 4,054,231. Once the processing fluid is in place, a motorized drive system (not shown) for the pinch rollers 50 and 52 is actuated so that the superimposed negative and positive sheets are fed downwardly through the slot 54 in a manner effecting a uniform spreading of the processing fluid between the two sheets in accordance with well-known diffusion transfer processing.

Figure 2:
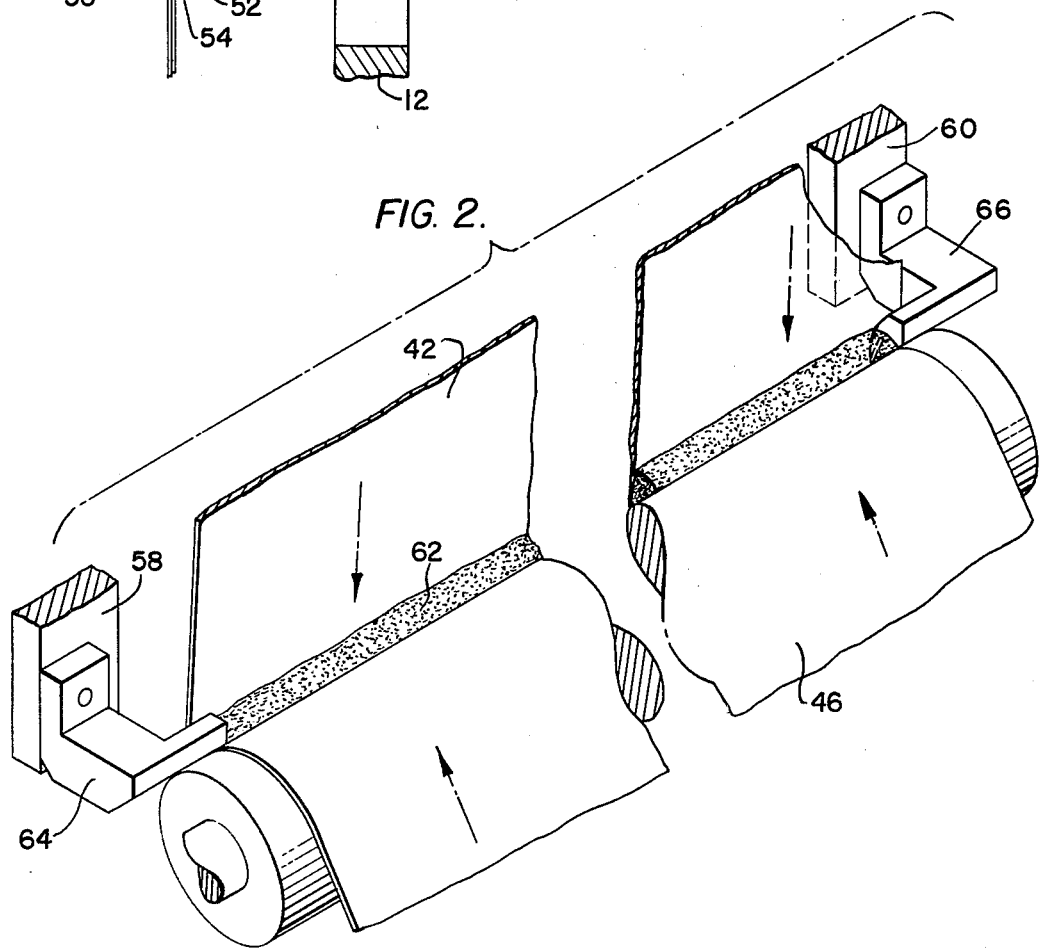
FIG. 2 is a fragmentary perspective view illustrating the processing fluid containment apparatus of the present invention.
Figure 3:
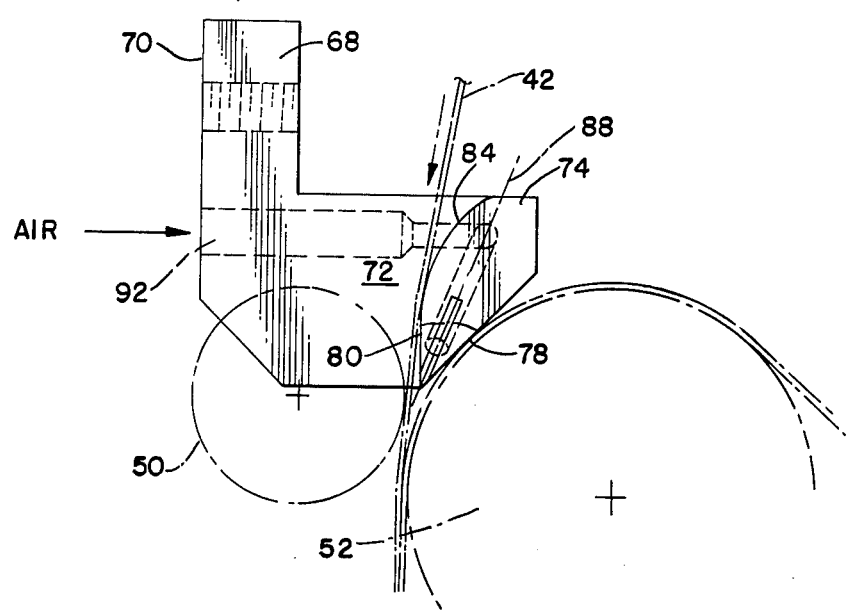
FIG. 3 is a side elevation of an air nozzle component of the invention.
Figure 4:
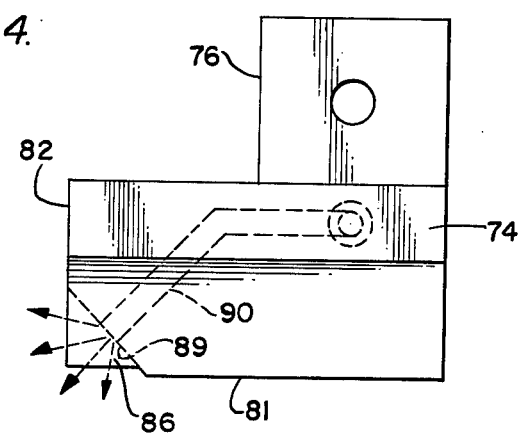
FIG. 4 is a front elevation of the nozzle component.
Figure 5:
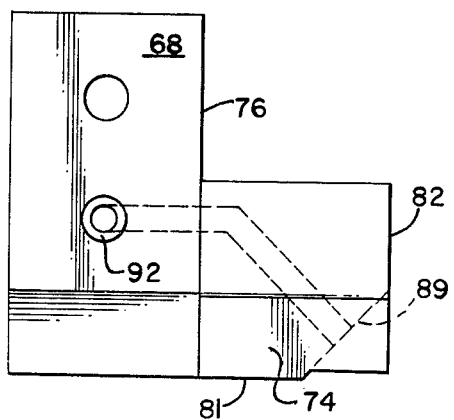
FIG. 5 is a rear elevation of the nozzle component.
Figure 6:
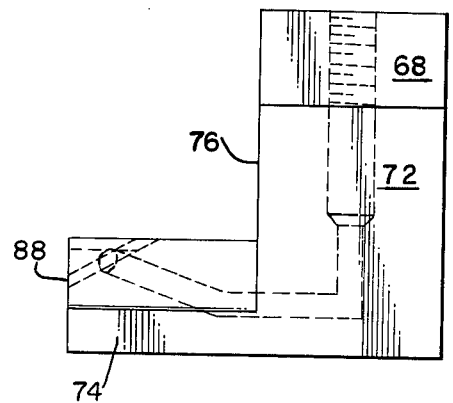
FIG. 6 is a top plan view of the nozzle.

In FIG. 2, the crease defined between the negative and positive sheets 42 and 46, as they enter the pressure roll nip 48, is shown to contain a pool or puddle 62 of processing fluid deposited in the manner above-mentioned. Although the metered quantity of such fluid, coupled with the pressure exerted against the back of the sheets 42 and 46, will assure vertical coverage of the format area of the latent image formed by exposure on the negative sheet, the fluid must be laterally contained along the side edges of the sheet both on initial deposition of the puddle 62 and during movement of the sheets through the nip 48. In accordance with the present invention, such lateral containment of the processing fluid is effected by a pair of nozzle members 64 and 66 fixedly secured near the bottom of the frame components 58 and 60 of the camera back 22. While complementary in configuration to be operative at left and right-hand sides of the nip 48 respectively, the nozzle members 64 and 66 are of identical construction and illustrated most completely in FIGS. 3-6 of the drawings. In these figures, the nozzle 66 is shown to include a vertically extending mounting leg 68 having a planar rear surface 70 for direct abutment with the face of the frame member 60, a cantilevered support leg 72 and a laterally projecting nozzle blade 74 projecting laterally beyond an inboard edge surface 76 common to both legs 68 and 72.

The nozzle blade portion 74 of each member 64 and 66 is shaped having a pair of downwardly convergent, laterally extending front and rear surfaces 78 and 80 terminating downwardly in an edge 81 and inwardly at an inboard end surface 82 which lies in a plane normal to the edge 80 and the rotational axes of the rollers 50 and 52. Also, it will be noted that the rear surface 80 merges with a curved surface 84 which diverges forwardly away from the plane of the negative sheet 42 (FIG. 3) in a manner to provide a smooth guiding entry of the negative sheet 42 to the nip 48 between the pressure roll pair.

Machined in the end face 82 of the nozzle blade 74 is a downwardly and inwardly bottoming narrow slot 86, the medial plane 88 of which bisects the angle between the surfaces 78 and 80 and is approximately tangential to both rollers 50 and 52. The bottom 89 of the slot 86 extends diagonally between the end surface 82 and the bottom edge 81 of the blade portion 74 or at a 45° angle with respect to both the end surface 82 and the bottom edge 81. The slot bottom 89 opens at its center to a downwardly and inwardly inclined air discharge or outlet passage 90 which communicates with an air inlet port 92 opening through the surface 70 of the mounting leg 68. The port 92 communicates directly with a source of compressed air (not shown) adapted to be operated concurrently with operation of the drive mechanism for the pressure rollers 50 and 52.

The nozzle members 64 and 66 are either machined or molded from a synthetic resinous material such as nylon or the like and as such are chemically inert to the processing fluid. As pointed out in the text of the aforementioned U.S. Pat. No. 4,054,231, the processing fluid used is a relatively viscous aqueous alkaline solution so that the less than complete sealing complementary contact between the converging surfaces 78 and 80 with the negative and positive sheets 42 and 46 will be adequate for the end faces 82 to act as dams for the puddle of processing fluid after it is initially deposited and prior to driving rotation of the pressure rollers 50 and 52. As soon as rotation of the rollers 50 and 52 is initiated, compressed air will be discharged through the slot 86 to confine the outer margins of applied processing fluid inside the faces 82. As a result of this organization, there is no fouling of the blade portions 74 with the processing fluid during the processing operation.

Thus, it will be appreciated that as a result of the present invention there is provided a highly effective processing fluid containment apparatus for large format cameras and by which the above-mentioned objectives are completely fulfilled. Also, it will be apparent to those skilled in the art that various modifications and/or changes may be made in the embodiments disclosed herein without departure from the inventive concepts manifested thereby. Accordingly, it is expressly intended that the foregoing description is illustrative of a preferred embodiment only, not limiting, and that the true spirit and scope of the present invention be determined by reference to the appended claims.

What is claimed is:

1. A large format camera of the type in which a negative film sheet may be exposed and thereafter processed in conjunction with a positive film sheet to provide a positive image photographic print, said camera comprising:
   a film exposure plane;
   a pair of elongated processing rollers;
   means for mounting said processing rollers for rotation in closely spaced apart relation with respect to each other so as to define a pressure applying gap therebetween through which the negative film sheet may be advanced from the film plane and the positive film sheet may be advanced from a stored position spaced apart from said film plane to converge with the negative film sheet along said pressure applying gap;
   means for accommodating the deposition of a select quantity of processing fluid composition between the converging negative and positive film sheets at a location closely adjacent said pressure applying gap, said quantity of processing composition being selected to be sufficient to be spread over an area between the negative and positive film sheets corresponding to the entire exposed area as the film sheets are drawn through the processing rollers; and
   means for retaining the spread of the processing composition inside the side edges of said negative and positive film sheets as the film sheets are advanced through said rollers, said spread retaining means comprising a pair of opposed nozzle members stationed respectively between said negative and positive film sheets adjacent opposed side edges thereof, each of said nozzle members having outside convergent surfaces complementary to the convergent film sheets and a nozzle opening between said convergent surfaces through which pressurized air may be discharged between the film sheets in a direction inwardly from the side edges of the film sheets and toward said roller gap so as to intersect the direction of film sheet advancement at an acute angle in order to retain the processing composition within the confines of the side edges of the film sheets during the spreading of the processing composition between the film sheets as the film sheets are advanced through said processing roller gap.

2. The camera of claim 1 wherein each pair of said convergent complimentary surfaces converge to a narrow edge aligned in spaced apart, substantially parallel relation with respect to said roller gap, said narrow edges also extending inwardly from respective side edges of the film sheets to respective generally flat unbound end surfaces which extend transverse to the film sheets.

3. The camera of claim 2 wherein said nozzle opening in each of said nozzle members comprises a narrow slot opening extending along a medial plane between said convergent surfaces and along said end wall and said narrow edge.

4. The camera of claim 3 wherein each of said narrow slots is defined in part by an end surface extending from said end wall to said narrow edge so as to intersect both said end wall and said narrow edge at an angle of approximately 45°.

5. The camera of claim 4 wherein each of said nozzle members includes an air outlet passage extending at right angles to an opening through said end surface of said narrow slot.

6. The camera of claim 2 wherein said spread retaining means further include means for supporting said nozzle members, said supporting means for each of said nozzle members comprising a first leg portion extending laterally outward from one of said convergent surfaces at a distance spaced apart from said flat inbound end surface together with a second leg portion extending laterally outward from said first leg portion in a direction generally transverse to said narrow edge.

7. The camera of claim 6 wherein each of said first and second leg portion is adapted to lie outwardly of the side edges of the film sheets.

* * * * *